2,829,998

SOLDERING FLUXES

Harry Ephraim Glynn, Sutton, and Peter Francis Pascoe, Worcester Park, England, assignors to Whiffen and Sons Limited, London, England, a British company No Drawing. Application March 12, 1956
Serial No. 570,699

Claims priority, application Great Britain March 23, 1955

9 Claims. (Cl. 148—23)

This invention relates to improved soldering fluxes for use in the soldering of metals generally and in particular for use in the soldering of aluminium and aluminium alloys.

It has been found that a flux comprising hydrazine mono- or di-hydrofluoride or mono- or di-fluoroborate together with an organic vehicle provides an excellent solder which, inter alia, gives excellent results in the soldering of aluminium and aluminium alloys to aluminium or aluminium alloy or another metal or alloy, and is only slightly less effective with commercially pure aluminium than with aluminium of the highest purity.

Accordingly the present invention is for a soldering flux comprising at least one hydrazine salt of hydrofluoric acid or fluoroboric acid and a solid, liquid or pasty vehicle comprising at least one organic cyclic or acyclic amino compound, hydroxy compound, ether or ester, the said vehicle being at the soldering temperature to be employed liquid and volatile substantially without decomposition.

The vehicle should of course be free from undue fire risk. If desired the vehicle may be diluted with a thinner, such as an organic cyclic or acyclic amino-compound, hydroxy compound, ether or ester, of lower melting or boiling point than the vehicle itself. The object of the thinner is, where desirable, to facilitate spreading of the flux before soldering and more particularly to reduce the viscosity of the molten vehicle during soldering.

Amongst suitable vehicles may be mentioned alkanolamines such as diethanolamine, triethanolamine and the like, condensed ethylene diamines such as tri-ethylene-tetramine, diethylenetriamine and the like, heterocyclic compounds such as dimethyl piperazines, esters such as dioctyl phthalate, dioctyladipate, 3:5:-trimethylhexyl sebacate, tributyl citrate, dibutyl phthalate and the like, polyglycols such as diethyleneglycol, triethylene glycol and octyleneglycol and the like, ethers such as diethylene glycol and triethylene glycol mono- and di-alkylethers, and the like.

It is preferred that the vehicle should be basic, and it has been found preferable to use as the vehicle diethanolamine or triethanolamine. The vehicle should be selected according to the temperature to be used in the soldering operation, which is normally in the range 200°–300° C.

A suitable solder for soldering aluminium is a lead-tin alloy of eutectic or other composition melting at 200–280° C. The preferred soldering temperature is 250°–280° C., for which temperature triethanolamine is particularly suitable as the vehicle.

Examples of suitable thinners include glycols such as ethyleneglycol, hexyleneglycol and the like, alkanolamines such as ethanolamine and the like, heterocyclic compounds such as alkylated morpholines and the like. In suitable cases a second vehicle may act as a thinner by lowering the melting point of the first vehicle. The proportion of thinner, if present, may vary over a wide range and comprise for example 10% or more of the weight of the vehicle.

The components of the soldering flux, namely the hydrazine salt and the vehicle, may be applied to the work separately or together as a mixture. The components of the flux are preferably in an anhydrous condition.

It is convenient to mix the hydrazine salt with the vehicle and apply the mixture to the metal. For this purpose a mixture containing from about 10% to 50% by weight of the hydrazine salt and from 90% to 50% by weight of the vehicle has been found very suitable. It is preferred to use as the soldering flux a mixture comprising 40 parts by weight of hydrazine dihydrofluoride and 60 parts by weight of triethanolamine.

It may be found advantageous to include a wetting agent in the soldering flux. The proportion of wetting agent may vary over a wide range and for example comprise 0.1% to 10% of the flux. It has been found suitable to use about 2% of wetting agent. The wetting agents which may be used include anion, cationic and nonionic wetting agents known in the art. Examples of such wetting agents include alkyl aryl sulphonates, condensates of alkylcresols and ethylene oxide, polyoxyethylene ethers and esters, sorbitan esters and the like. It has been found preferable to use as wetting agents condensates of alkyl cresols and ethylene oxide, such as the material sold under the trademark Lissapol NX.

The following examples are given to illustrate a method of soldering according to the present invention:

*Example 1*

An electrical lead of copper wire was required to be soldered to a thin strip of commercially pure aluminium. The surfaces to be joined were cleaned, placed in contact and smeared over lightly with a mixture comprising 4 parts of hydrazine monohydrofluoride and 6 parts of triethanolamine. Tin solder was applied in the usual manner with an electrically heated soldering iron. A temperature of about 280° C. was maintained for a few seconds to evaporate the triethanolamine, and after removal of the soldering iron the joint was wiped to remove debris (mainly aluminium fluoride). A strong joint resulted.

*Example 2*

The process of Example 1 was repeated exactly as described above with the exception that the soldering flux employed comprised a mixture of 4 parts of hydrazine dihydrofluoride and 6 parts of triethanolamine. A strong joint resulted.

We claim:

1. A soldering flux consisting essentially of about 10–50% by weight of at least one hydrazine salt selected from the group consisting of hydrazine salts of hydrofluoric acid and hydrazine salts of fluoroboric acid, and of 90–50% by weight of a vehicle comprising an amino compound selected from the group consisting of organic cyclic amino-compounds and organic acyclic amino-compounds, the said vehicle being liquid and volatile substantially without decomposition at the soldering temperature.

2. A soldering flux as claimed in claim 1 wherein the flux also contains as thinner a hydroxy compound.

3. A soldering flux as claimed in claim 1 which additionally consists essentially of a wetting agent.

4. A soldering flux which consists essentially of about 10–50% by weight of hydrazine mono-hydrofluoride and of 90–50% by weight of diethanolamine.

5. A soldering flux which consists essentially of about 10–50% by weight of hydrazine di-hydrofluoride and of 90–50% by weight of di-ethanolamine.

6. A soldering flux which consists essentially of about

10–50% by weight of hydrazine mono-hydrofluoride and of 90–50% by weight of triethanolamine.

7. A soldering flux which consists essentially of about 10–50% by weight of hydrazine di-hydrofluoride and of 90–50% by weight of triethanolamine.

8. A soldering flux consisting of about 10 to 50% by weight of a hydrazine salt of hydrofluoric acid and of about 90 to 50% by weight of a vehicle comprising an alkanolamine.

9. A soldering flux consisting of about 10 to 50% by weight of a hydrazine salt of fluoroboric acid and of about 90 to 50% by weight of a vehicle comprising an alkanolamine.

References Cited in the file of this patent

UNITED STATES PATENTS

| | | |
|---|---|---|
| 1,785,134 | McQuaid | Dec. 16, 1930 |
| 2,330,904 | Miller | Oct. 5, 1943 |
| 2,612,459 | Willard | Sept. 30, 1952 |
| 2,659,684 | Neish | Nov. 17, 1953 |